(12) United States Patent
Spitz

(10) Patent No.: US 7,348,999 B1
(45) Date of Patent: Mar. 25, 2008

(54) ALIGNMENT METHOD AND APPARATUS

(76) Inventor: Glenn Steven Spitz, 4 Cain Dr., Brentwood, NY (US) 11717

( * ) Notice: Subject to any disclaimer, the term of this patent is extended or adjusted under 35 U.S.C. 154(b) by 97 days.

(21) Appl. No.: 11/170,346

(22) Filed: Jun. 29, 2005

(51) Int. Cl.
*G06T 11/00* (2006.01)
(52) U.S. Cl. ..................... 345/689
(58) Field of Classification Search ........... 345/689, 345/650
See application file for complete search history.

(56) References Cited

U.S. PATENT DOCUMENTS

| | | | |
|---|---|---|---|
| 3,862,400 A | 1/1975 | Thomson | |
| 4,055,747 A | 10/1977 | Jensen | |
| 4,349,742 A | 9/1982 | Flurry et al. | |
| 4,449,052 A | 5/1984 | Krieg | |
| 4,613,942 A | 9/1986 | Chen | |
| 5,093,653 A * | 3/1992 | Ikehira | 345/657 |
| 5,296,690 A | 3/1994 | Chandler et al. | |
| 6,301,763 B1 | 10/2001 | Pryor | |
| 6,565,003 B1 | 5/2003 | Ma | |
| 6,708,884 B1 | 3/2004 | Su et al. | |

* cited by examiner

*Primary Examiner*—Almis R. Jankus
(74) *Attorney, Agent, or Firm*—Island Patent; F. Scott Tierno

(57) ABSTRACT

An alignment aiding method and apparatus enables an orienting and positioning of a data carrying 2-dimensional graphical symbol within a field of view of an imaging device. The desired orientation and position is indicated by a graphical alignment indicator. The graphical alignment indicator is displayed in a fixed position on a display device, while an image of the graphical symbol is also displayed, and preferably updated and refreshed at a suitable refresh rate to provide usable feedback. While being displayed, the graphical symbol may be moved, oriented, and positioned, thereby enabling a substantial aligning of the data carrying 2-dimensional graphical symbol with the graphical alignment indicator. This abstract is provided to comply with rules requiring an abstract, and is submitted with the intention that it will not be used to interpret or limit the scope and meaning of the claims.

13 Claims, 11 Drawing Sheets

64a

64b

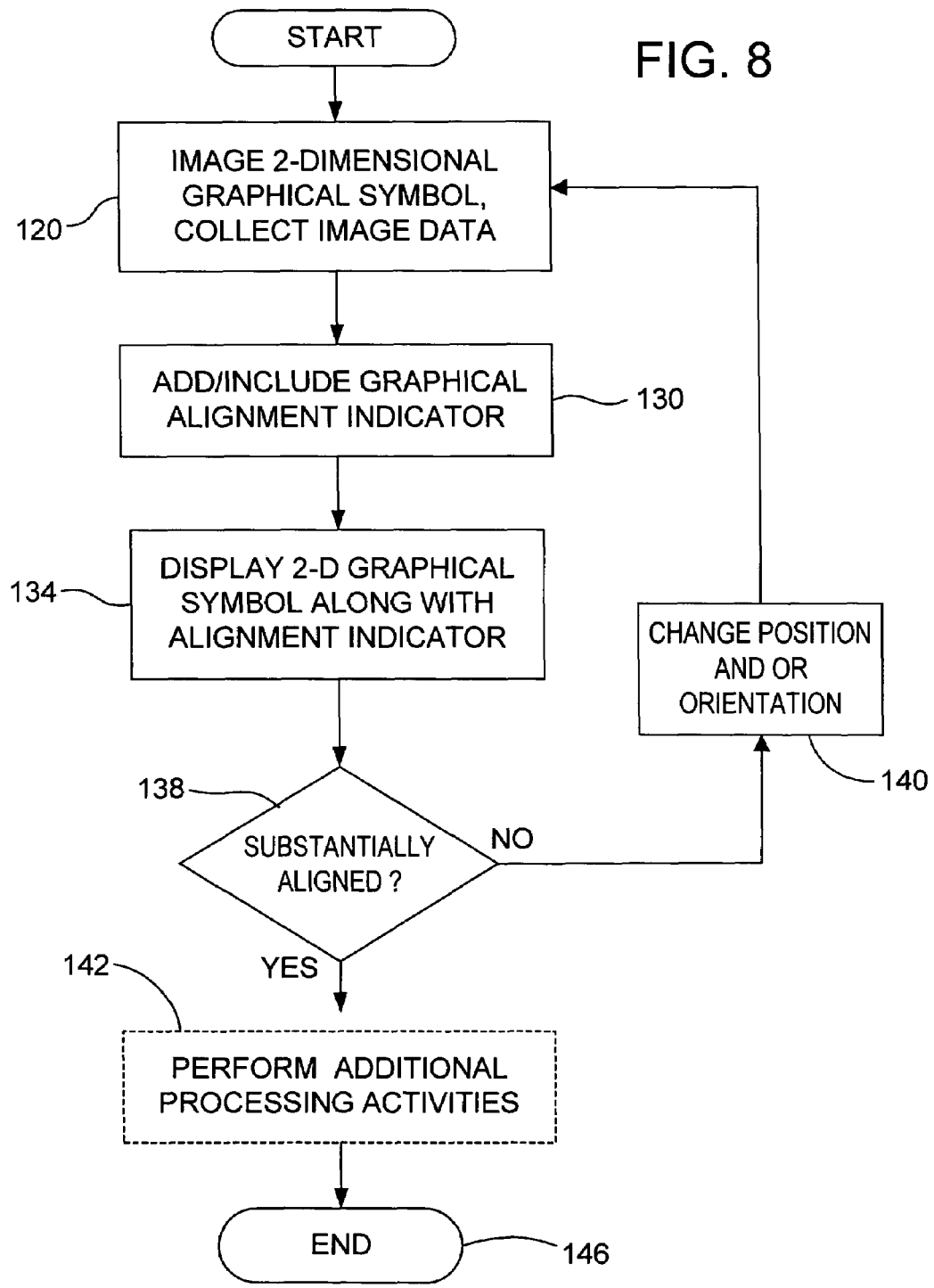

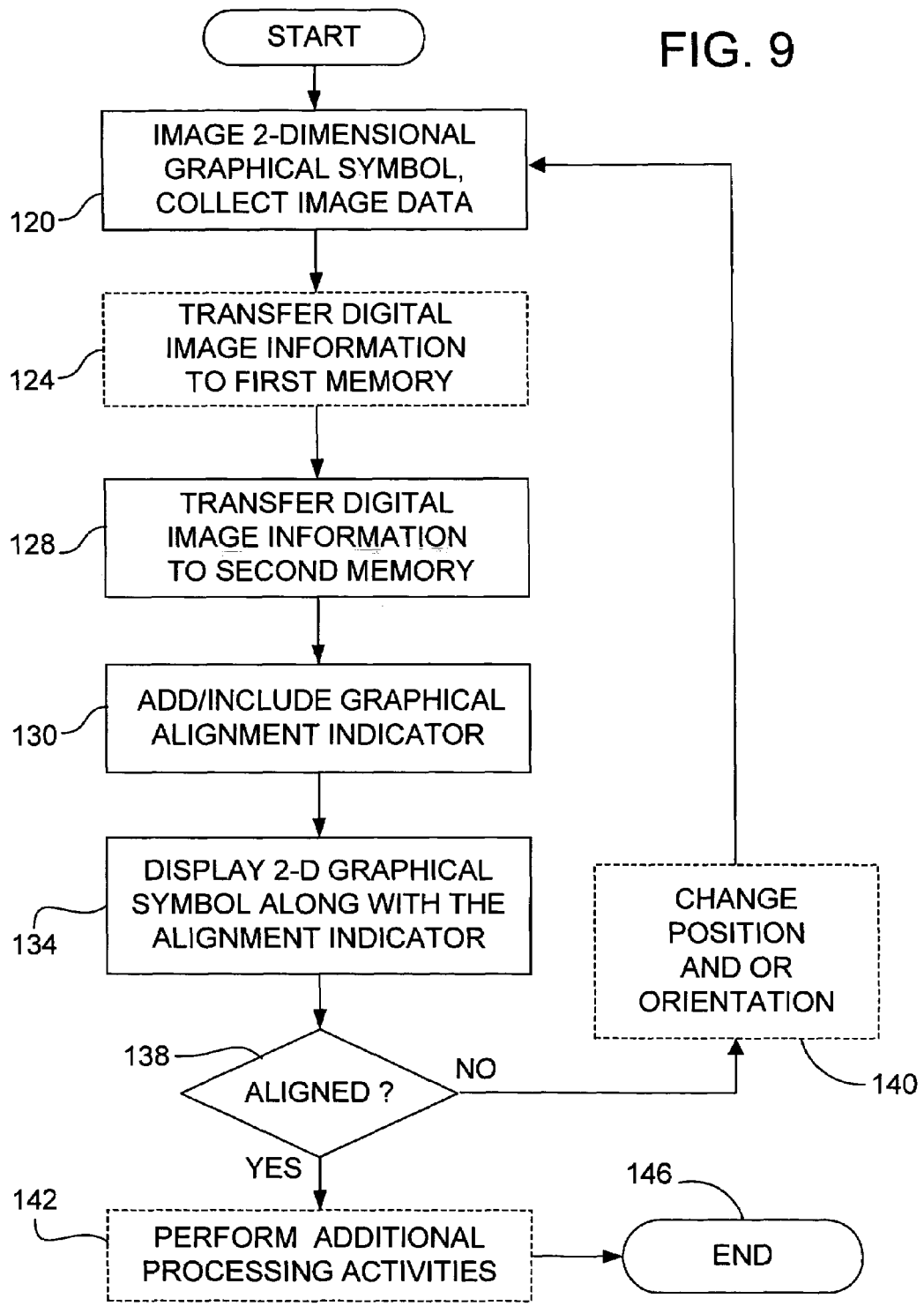

ALIGNMENT METHOD AND APPARATUS

TECHNICAL FIELD

The present invention relates most generally to alignment aides. More particularly, the invention relates to a method and means for aligning a data carrying 2-dimensional graphical symbol with an alignment indicator for placing the data carrying 2-dimensional graphical symbol at a pre-defined orientation and position within the field of view of an imaging device.

BACKGROUND

It is known in the art that a full and proper verification or evaluation of a data carrying 2-dimensional graphical symbol must be implemented with a precise lighting arrangement, and with the graphical symbol placed in each of a plurality of orientations and positions. For example, when considering available industry-standard evaluation guidelines, a data carrying 2-dimensional graphical symbol may be required to be placed precisely in a sequence of 4, 6, or more, orientations and positions, for subsequent imaging activities at each respective orientation and position.

However, current technology does not provide a simple and cost effective approach (i.e., adding little or no additional hardware) for enabling an easy and sure orienting and positioning of a printed graphical symbol in a field of view (FOV) of an imaging device. Accordingly, it would be most desirable to provide a simple and cost effective method and means for somewhat precisely placing the data carrying 2-dimensional graphical symbol at a desired orientation and position within the FOV of an imaging device. A number of other characteristics, advantages, and or associated novel features of the present invention, will become clear from the description and figures provided herein. Attention is called to the fact, however, that the drawings are illustrative only. In particular, the embodiments included and described, have been chosen in order to best explain the principles, features, and characteristics of the invention, and its practical application, to thereby enable skilled persons to best utilize the invention and a wide variety of embodiments providable that are based on these principles, features, and characteristics. Accordingly, all equivalent variations possible are contemplated as being part of the invention, limited only by the scope of the appended claims.

SUMMARY OF THE INVENTION

In accordance with the present invention, a method and means provide for an orienting and positioning of a data carrying 2-dimensional graphical symbol, situated within a field of view (FOV) of an imaging device, such that the 2-dimensional graphical symbol is placed in a first/next pre-defined orientation and position, possibly of a plurality of possible pre-defined orientation-position pairs.

It is important to understand that preferred embodiments of the present invention, when considered broadly, provide for a displaying of a graphical alignment indicator (preferably with a fixed orientation and position) while also displaying an image of the data carrying 2-dimensional graphical symbol. The image of the data carrying 2-dimensional graphical symbol is preferably updated, in real time, at a refresh rate that provides usable feedback. The refresh rate may be best selected based on the application in which the methods and apparatus of the invention are employed, but does not necessarily have to provide 'full video' performance, which may unnecessarily increase system implementation costs. A possibly most preferred range of refresh rates may be assumed to be from 1 Hz to 80 Hz. For example, if a rate of 30 Hz is employed, as the graphical symbol is moved and rotated within the FOV, the display provides a somewhat smooth "feedback", thereby enabling a substantial aligning of the graphical symbol and the graphical alignment indicator to be realized in a rapid and efficient manner. If a lower refresh rate is employed, the image of the moving graphical symbol may appear "jumpy", but will still enable a substantial aligning to be readily realized. In a possibly most preferred embodiment of the invention, the display is refreshed at the highest rate that can be achieved with the hardware employed or available, while still carrying out the steps required to provide the image of the data carrying 2-dimensional graphical symbol and the image of the graphical alignment indicator. As understood by skilled persons, in practice the actual refresh rate may not be at a constant.

Once substantially aligned, new or previously collected digital image information of the graphical symbol (in that orientation and position) may be utilized as needed. For example, the stored digital image information may be employed to evaluate the print quality of the graphical symbol.

As such, a first preferred method of the invention aides in the orienting and positioning of a data carrying 2-dimensional graphical symbol within a field of view (FOV) of an imaging device by displaying, in a simultaneous fashion, an image of a data carrying 2-dimensional graphical symbol, while also displaying a graphical alignment indicator. As understood by skilled individuals, there are numerous hardware structures that may be employed with the methods disclosed herein. However, preferred architectures of the invention are those that support the methods of the invention, while also possibly supporting print quality verification activities without requiring the inclusion of additional hardware components.

Another preferred method of the invention provides for imaging the data carrying 2-dimensional graphical symbol located within the FOV of the imaging device, causing a collecting and storing of associated digital image information. The digital imaging information is subsequently made available in one or more included memory units, which may be termed a first memory, a second memory, a frame buffer memory, etc. Importantly, the memory employed should enable memory locations to be loaded, altered, and or read in a controlled fashion, as needed. For example, an altering of the contents of the memory may result in the modifying of the digital image information in order to overlay or introduce a graphical alignment indicator to the stored digital image information. Next, the resulting or modified digital image information may be output to a display device for aiding in placing the data carrying 2-dimensional graphical symbol at a pre-defined orientation and position within the FOV of the imaging device.

Alternately, instead of the modifying of digital image information, as described above, other approaches may be utilized to display the graphical alignment indicator and the data carrying 2-dimensional graphical symbol upon a display device, at the same time. For example, one approach would be to include a graphics display module supporting multiple 'image planes', also known as pixel planes. With such a hardware embodiment, one image plane may be employed to display the digital image information containing the image of the data carrying 2-dimensional graphical symbol, while a second image plane may be employed to display the graphical alignment indicator. Clearly, this approach means that a respective graphical alignment indicator needs to be loaded only once for indicating the desired orientation and position into which the data carrying 2-dimensional graphical symbol is to be placed.

Yet another preferred method of the invention will support the collecting of digital image information of the graphical symbol in each of a plurality of pre-defined orientations and positions of interest. That is, it may be desirable to collect digital image information containing an image of the graphical symbol of interest, sequentially, in each of a plurality of pre-defined orientations and positions to provide for a more complete evaluation or examination of the print quality of a printed data carrying 2-dimensional graphical symbol.

A preferred apparatus in accordance with the invention includes an imaging device with a suitable FOV for imaging one or more data carrying 2-dimensional graphical symbols of interest. The imaging device is coupled to, and responsive to, a computing unit. A first memory may be employed for receiving digital image information from the imaging device as images are captured. The digital image information would include data representing an image of the data carrying 2-dimensional graphical symbol located within the FOV of the imaging device.

The computing unit may be preferably structured to receive (or alternately transfer) the digital image information from the first memory for storing in a second memory. Subsequently, the computing unit may be configured to cause a modifying of the digital image information stored in the second memory for adding thereto an alignment indicator. Alternately, the second memory may be structured to provide "image planes", resulting in a need for a simple loading of the graphical alignment indicator image into an available image plane.

An included display device is coupled to the computing unit for receiving information, including the digital image information and the image of the graphical alignment indicator. Thereby enabling the displaying of each of the data carrying 2-dimensional graphical symbol and the graphical alignment indicator, simultaneously. The displaying of the graphical alignment indicator, which is maintained in a fixed manner on the display, thereby provides an indication for orientating and positioning the data carrying 2-dimensional graphical symbol, as needed, within the FOV of the imaging device.

The apparatus may further include a verifier module or capability, possibly provided as a software component. The verifier module would enable a processing of stored digital image information containing the image of the data carrying 2-dimensional graphical symbol for evaluating the print quality of the graphical symbol. For example, a most preferred embodiment of the apparatus would include firmware or software enabling such verifier activities to be performed. Such embodiments would typically support an additional displaying upon the display device of one or more determined quality indicators.

Importantly, a most preferred apparatus would enable the evaluating of the data carrying 2-dimensional graphical symbol in each of a plurality of pre-defined orientations and positions such that an overall quality indicator may be determined and made available (i.e. displayed, stored, and or transmitted to a remote location). The overall quality indicator may be useful for providing a more complete evaluation of the print quality of a graphical symbol.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows:

FIGS. 8, 9, 10A and 10B provide flowcharts of several exemplary, and somewhat simplified embodiments of methods employing one or more principles of the invention.

PARTIAL LIST OF REFERENCE NUMERALS

Figure 1:
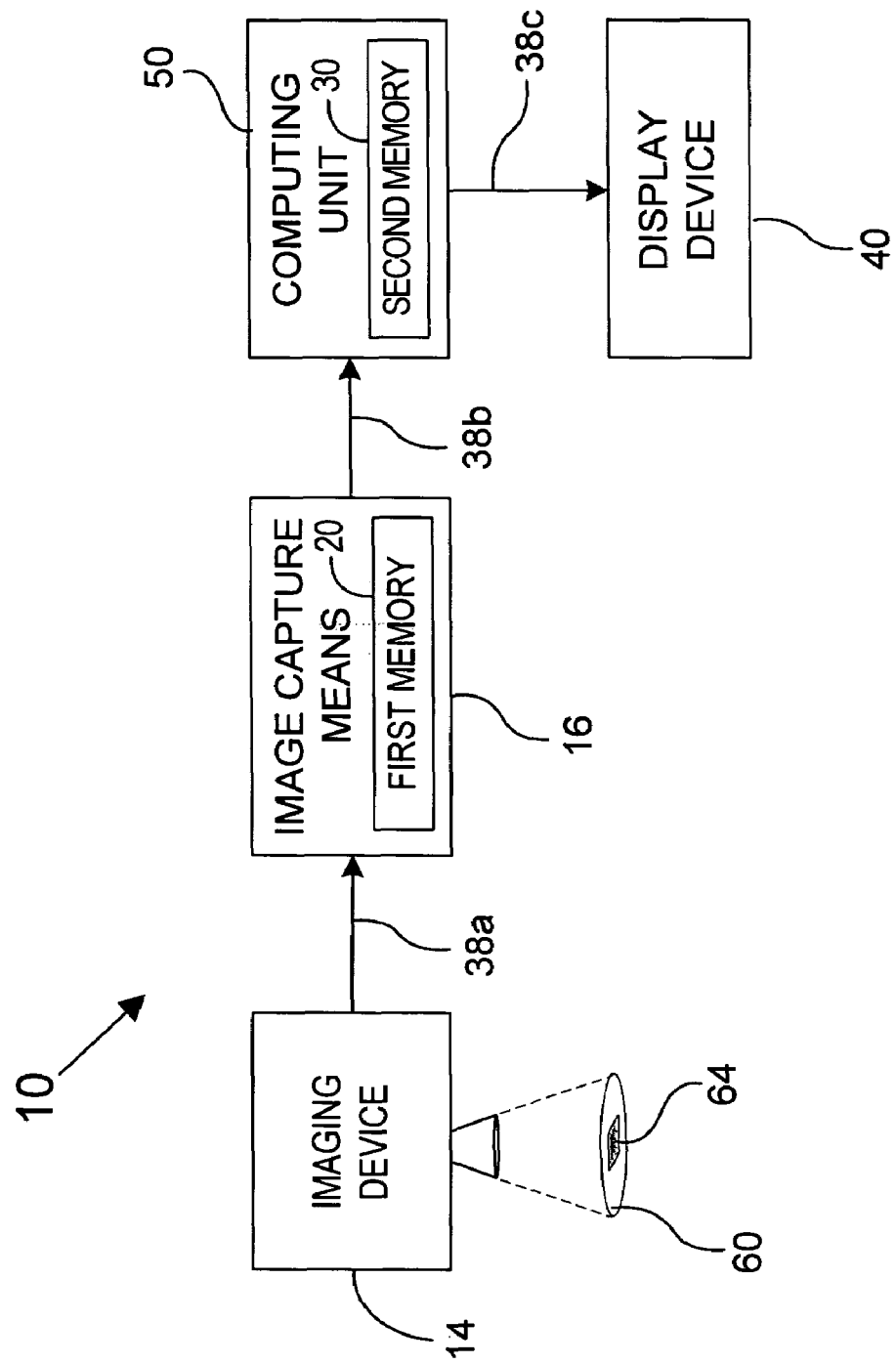
FIG. 1 is a high level block diagram of a preferred embodiment of the present invention.

| | |
|---|---|
| 10, 10a, 10b | alignment aiding apparatus embodiments |
| 14 | imaging device |
| 14a | CCD array imaging device |
| 16 | image capture means |
| 16a | image capture or frame grabber |
| 20 | first memory |
| 20a | frame buffer memory |
| 30 | second memory |
| 34 | input device |
| 38a | image signal |
| 38b | digital image signal |
| 38c | combined image signal |
| 40 | display device |
| 50 | computing unit |
| 50a | desktop computer |
| 52 | display interface |
| 58 | verifier module |
| 60 | field of view (of 14) |
| 64 | data carrying 2-D graphical symbol |
| 80 | first graphical alignment indicator |
| 82 | first line segment of 80 |
| 82a | first end of 82 |
| 82b | second end of 82 |
| 84 | second line segment of 80 |
| 84a | first end of 84 |

-continued

| | |
|---|---|
| 84b | second end of 84 |
| 90 | second graphical alignment indicator |
| 92 | first line segment of 90 |
| 94 | second line segment of 90 |
| 96 | third line segment of 90 |
| 100 | third graphical alignment indicator |
| 100a | TOP annotation |
| 100b | BOTTOM annotation |
| 102 | first bracket of 100 |
| 106 | second bracket of 100 |

DETAILED DESCRIPTION OF EMBODIMENTS OF THE INVENTION

It is important to establish the definition of a number of descriptive terms and expressions that will be used throughout this disclosure. The term 'imaging device' is to be broadly defined, and as such may be provided by many available imaging technologies, including both analog and digital types, and ranging from a simple progressive scanning device (i.e. a laser scanner), to a video camera, to an advanced photon sensitive semi-conductor device (e.g., a CCD or CMOS imaging device). The terms 'data carrying 2-dimensional graphical symbol', 'data carrying graphical symbol', and 'graphical symbol' are to be considered equivalents. The term "graphical alignment indicator" is to be understood to include any 2-dimensional graphical representation that can be displayed using a display device for clearly indicating a desired orientation and position into which a graphical symbol of interest is to be placed. Importantly, the graphical alignment indicator is to be displayed, along with an image of a data carrying 2-dimensional graphical symbol, for indicating movements required to cause a "substantial aligning" of the graphical symbol with the graphical alignment indicator. As will become clear from a review of the figures and descriptions provided hereinafter, an optimum graphical alignment indicator will clearly indicate the needed motions for properly orienting and positioning the graphical symbol within the field of view (FOV) of the imaging device. The term 'orientation-position pair' may be assumed to be an indicator of both position information (e.g., x and y coordinates), along with a specified orientation (e.g., a specified angular rotation). As such, any orientation-position pair specifies both an orientation and a position within a field of view of an imaging device. The terms 'coupled', 'coupled to', 'being coupled to', etc., are to be understood to mean that two or more described items are either directly connected together, or alternately, connected to each other via one or more additional, possibly implied or inherent structures or components. For example, when considering the imaging device and the computing unit of the present invention, the imaging device may be directly connected to the computing unit, or alternately, connected via one or more additional electrical and or mechanical items/structures—which would be well known to skilled persons. Other important terms and definitions will be provided, as they are needed, to properly define the present invention and its associated novel characteristics and features.

Referring now to the drawings, FIG. 1 depicts an alignment aiding apparatus 10 that enables an orienting and positioning of a data carrying 2-dimensional graphical symbol 64 within a field of view (FOV) 60 of an imaging device 14 in at least one pre-defined orientation and position for imaging purposes. Included is an imaging device 14 with an optical section providing for, or defining, a field of view (FOV) 60. The imaging device 14 may preferably be coupled to a first memory 20, which may be provided by an image capture means 16. As skilled persons will appreciate, the image capture means 16 may be provided as a portion of the imaging device 14 or as a portion of an included computing unit 50. Alternately, as implied in FIG. 1, the image capture means 16 may be provided as a separate unit. Regardless of where the image capture means 16 is physically provided, the function provided is to capture a 2-dimensional image, with resulting digital image information stored in a memory thereof. For example, as illustrated in FIG. 1, a first memory 20 may be provided for this purpose.

The included computing unit 50, or an equivalent controller, may be structured for receiving image information from the first memory 20 for storing in a second memory 30. In a preferred apparatus 10 of the invention, the first memory 20 would store the image information as digital image information, which is subsequently transferred to, and stored in the second memory 30. The computing unit 50 may be further configured for appending image information to the digital image information stored in the second memory 30 for adding, overlaying, or more generally including a selected graphical alignment indicator. The selected or available graphical alignment indicator is employed for aiding in orienting and positioning the data carrying 2-dimensional graphical symbol within the FOV 60 of the imaging device 14.

To this end, the apparatus 10 of FIG. 1 includes a display device 40. The display device 40 is operatively coupled to the computing unit 50, and included for receiving modified digital image information/data, now stored in the second memory 30, containing the images of both the graphical symbol 64 and the graphical alignment indicator. Accordingly, a displaying of modified image information of the second memory 30 enables the simultaneous displaying of both the data carrying 2-dimensional graphical symbol 64 and the graphical alignment indicator (not explicitly illustrated). It is important to note that the signals 38a, 38b, and 38c represent signals that carry image information. Signal 38a contains image information, possibly including the image of a data carrying 2-dimensional graphical symbol 64, which may be provided as an analog or digital signal. Signal 38b is preferably a digital signal containing digital image information. Finally signal 38c is an image containing signal that enables the displaying of the data carrying 2-dimensional graphical symbol 64 and the graphical alignment indicator—simultaneously, as required.

It is important to note that the most preferred embodiments of the present invention enable the position of the data carrying 2-dimensional graphical symbol 64 to be altered, while the position of a graphical alignment indicator is maintained. Accordingly, the desired orientation and position is indicated by a graphical alignment indicator, which is presented along with the image of the data carrying graphical symbol 64. Most preferably, the image of the data carrying graphical symbol 64 is updated or refreshed (upon the display), in real-time, wherein the graphical symbol 64 may be moved and rotated, while being "observed", until there is a substantial aligning of the graphical symbol 64 with the graphical alignment indicator. Once substantially aligned, image information may be processed, for example, such that the print quality of the data carrying 2-dimensional graphical symbol 64 may be evaluated.

Figure 2:
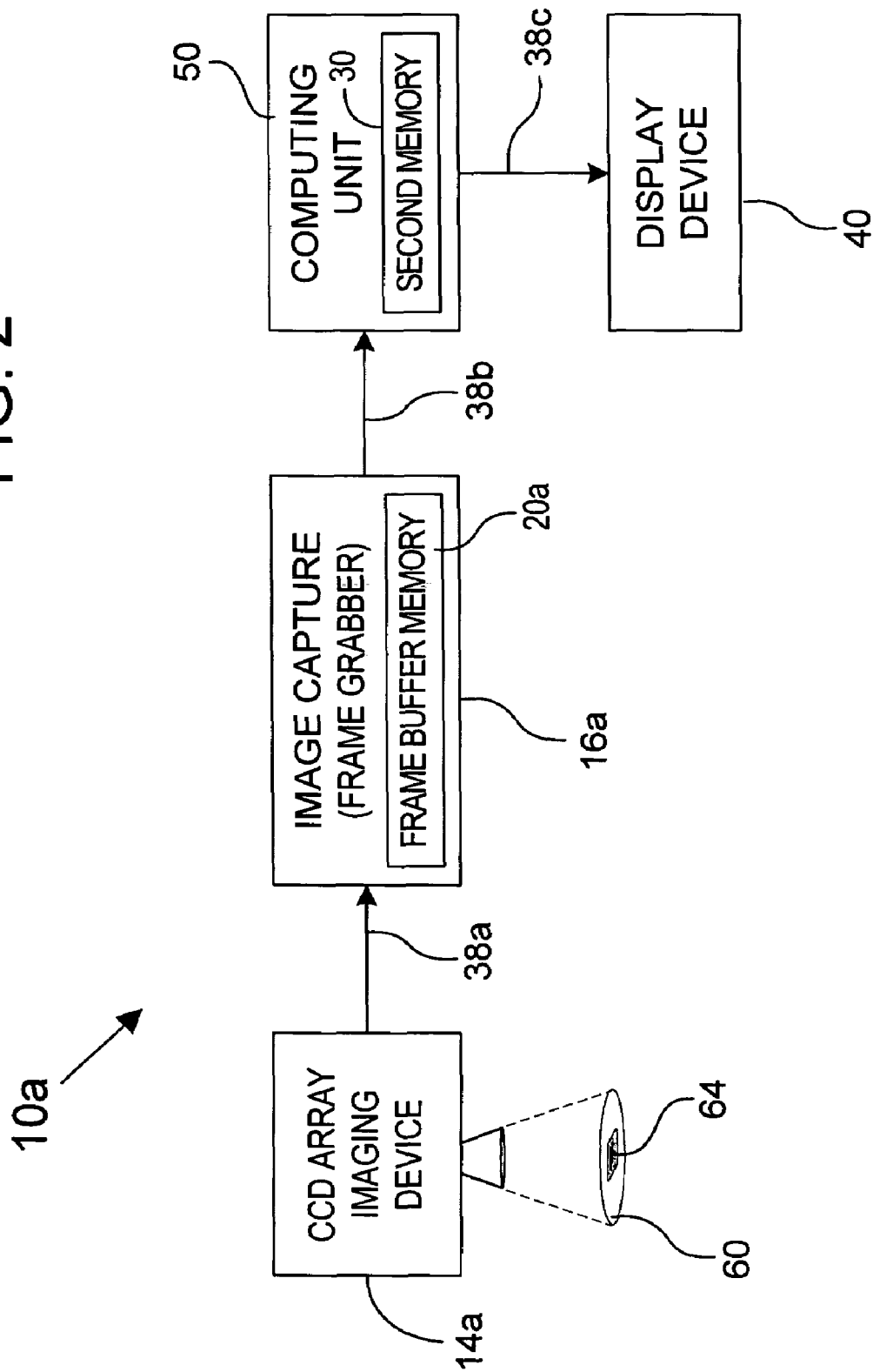
FIG. 2 provides a more detailed block diagram of an embodiment of the invention that is consistent with the depiction of FIG. 1

Turning now to FIG. 2, there is provided therein a more detailed block diagram of an embodiment 10a of the invention, which is consistent with the high level block diagram of FIG. 1. As shown, this preferred embodiment includes a monochrome 2-dimensional array imaging device, such as a charge coupled device (CCD) array imaging device 14a. A field of view (FOV) 60 is focused on a data carrying 2-dimensional graphical symbol 64. The CCD imaging device 14a is coupled to an image capture portion 16a, which as described hereinabove, preferably captures at least one image containing the graphical symbol 64 in a first memory, such as frame buffer memory 20a. Next, digital image information contained in the frame buffer memory 20a may be transferred into a second memory 30 of the computing unit 50. Once loaded in the second memory 30, the digital image information may be appended and or modified by the "including" of the graphical alignment indicator. It is important to note that it is possible to add or include a graphical alignment indicator in many ways. For example, the above method provided for adding or overlaying the graphical alignment indicator after the digital image information containing the image of the data carrying 2-dimensional graphical symbol 64 was previously stored in the memory.

Alternately, the graphical alignment indicator may be added before hand (possibly only once) with those locations employed for storing the graphical alignment indicator configured for not being written when the image information is stored in the memory. Still yet another possible approach, as discussed hereinabove, would provide a graphics capability (in hardware and or software) supporting multiple "image planes", which may be equivalently termed "pixel planes". This latter arrangement may provide one image plane for displaying the digital image information of the FOV of the imaging device 14/14a, while others may support a displaying of the graphical alignment indicator, text data, instructions, etc. Skilled persons will appreciate the varied approaches, and associated hardware structures, which may be employed with the fundamental aspects and features of the present invention.

Figure 3:
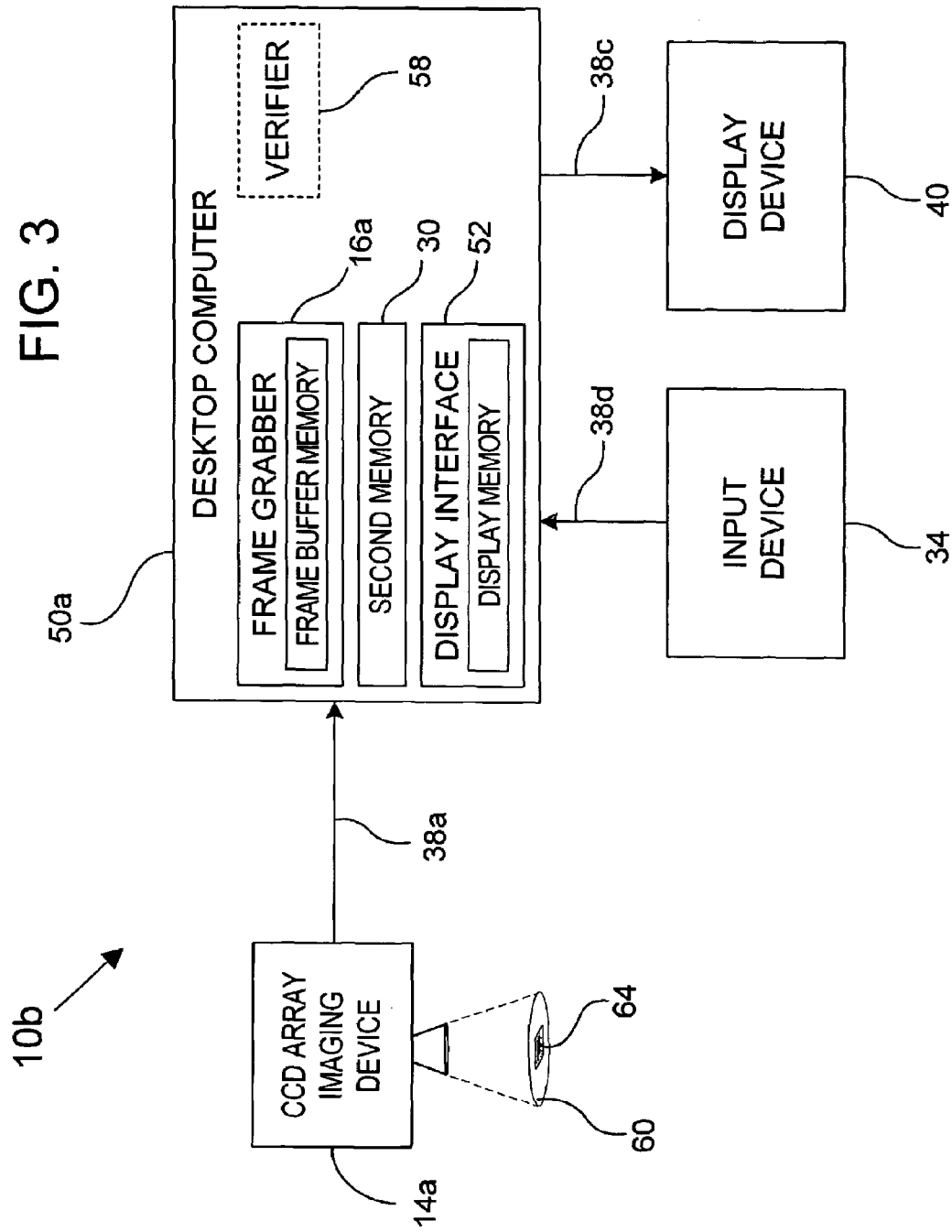
FIG. 3 provides a block diagram of a possibly most preferred embodiment of the invention, which may be constructed using a number of off-the-shelf components and or sub-systems.

A possibly most preferred embodiment of the computing unit 50, as depicted in FIG. 3, may be provided by a desktop computer 50a. Suitable desktop computers 50a may include personal desktop computers, laptop or tablet personal computers, etc. As depicted the desktop computer 50a may include the frame grabber 16a and frame buffer memory, for example as a plug-in circuit card. The desktop computer 50a may also include a display interface 52 for generating signal 38c. Also, an input device 34 may be included and coupled to the desktop computer 50a by signal 38d.

As appreciated by skilled individuals, a computing unit such as the desktop computer 50a may be configured with firmware or software for providing a number of desirable functions and features. For example, it may be desirable to include an evaluation or verification capability by including a verifier module 58. Also, it is contemplated that the graphical alignment indicator may be manually or automatically selected and included with the stored digital image information by firmware or software.

Figure 4A:
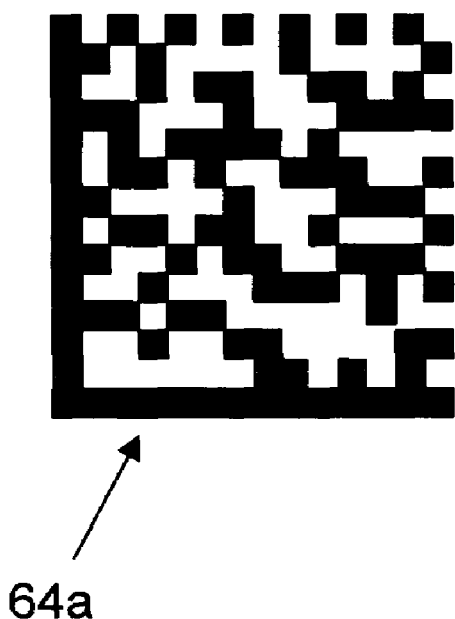
FIGS. 4A and 4B provide examples of data carrying 2-dimensional matrix graphical symbols with which the present invention may be employed.
Figure 4B:
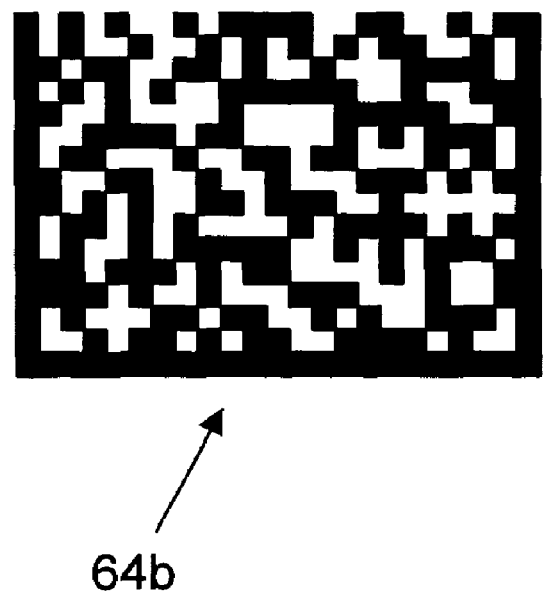
Figure 5A:
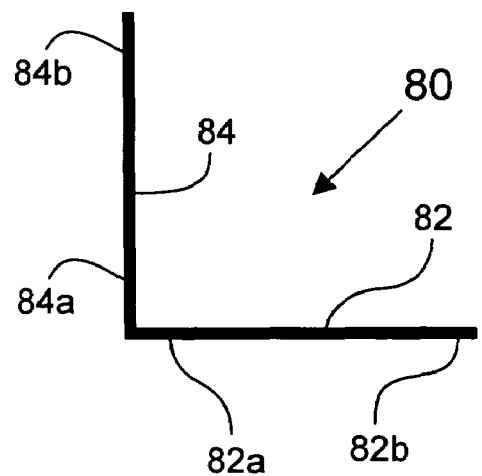
FIGS. 5A, 5B, and 5C depict several examples of graphical alignment indicators employable with the invention.

Referring briefly to FIGS. 4A and 4B, several exemplary data carrying 2-dimensional graphical symbols are illustrated. A first graphical symbol 64a is depicted as substantially square providing two sides having solid thick boarders. Such a graphical symbol 64a, which may be equivalently termed a matrix symbol, may be associated with the alignment aid 80 of FIG. 5A. As shown, the graphical alignment indicator 80 may be provided by an L-shaped symbol, composed of a first line segment 82 and a second line segment 84. The first line segment 82 and the second line segment 84, as illustrated, may be joined at the endpoints of each respective line segment, 82a and 84a, with the first line segment 82 oriented orthogonally to the second line segment 84. Clearly, the alignment aid of FIG. 5A would be employable with graphical symbol 64a of FIG. 4A with little or no explanation.

Figure 5B:
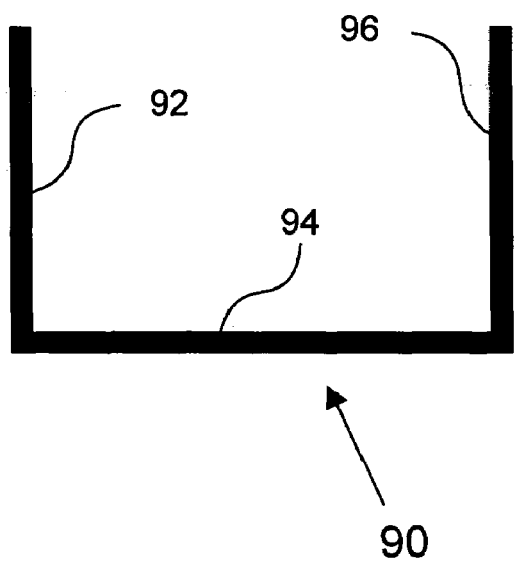
Figure 5C:
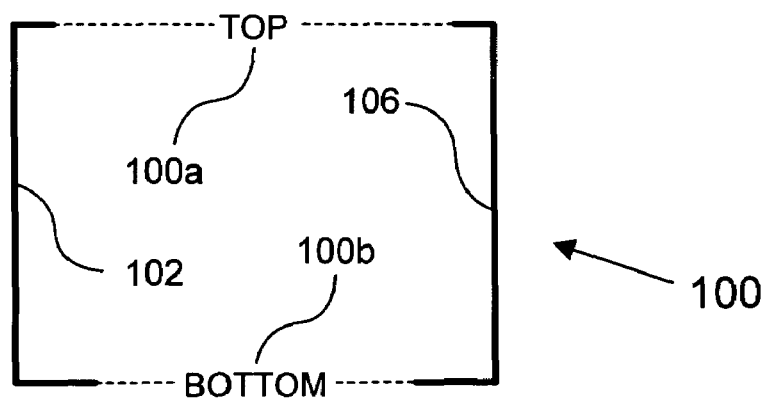

Similarly, the graphical symbol 64b of FIG. 4B, may be associated with graphical alignment indicators 90 and 100, of FIGS. 5B and 5C, respectively. As shown in FIG. 5B, a U-shaped graphical alignment indicator 90 may be composed of three line segments 92, 94, and 96. The graphical alignment indicator 100 provides a 'bracket' style alignment indicator, including a first or left bracket 102 and a second or right bracket 106. In addition, annotation may be included, such as the TOP annotation 100a and the BOTTOM annotation 100b. Skilled individuals, upon a review of this disclosure, could readily provide additional 2-D graphical symbols and 2D graphical alignment indicators in accordance with the present invention. Essentially, any data carrying graphical symbol that can be aligned and imaged in accordance with the present invention, and any graphical alignment indicator useful for non-ambiguous aligning activities, are to be considered within the scope of the claimed invention. It may be noted that when generically referring to data carrying 2-dimensional graphical symbols with which the present invention may be employed, the reference designation '64' is used.

Figure 6A:
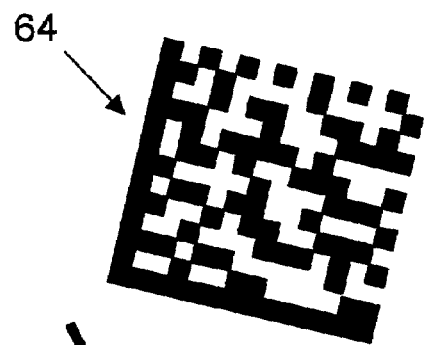
FIG. 6A depicts a data carrying 2-dimensional graphical symbol that is not nearly substantially aligned with a presented graphical alignment indicator.

The term "substantially aligned" will be described and defined by turning briefly to FIGS. 6A, 6B, and 6C. The data carrying 2-dimensional graphical symbol 64 of FIG. 6A may be termed "not nearly substantially aligned", with respect to the presented graphical alignment indicator 80. Recall, the methods of the present invention call for the maintaining of the position of graphical alignment indicator 80, while the orientation and position of the data carrying 2-dimensional graphical symbol 64 may be altered and displayed in real-time upon a display device such as display device 40.

Figure 6B:
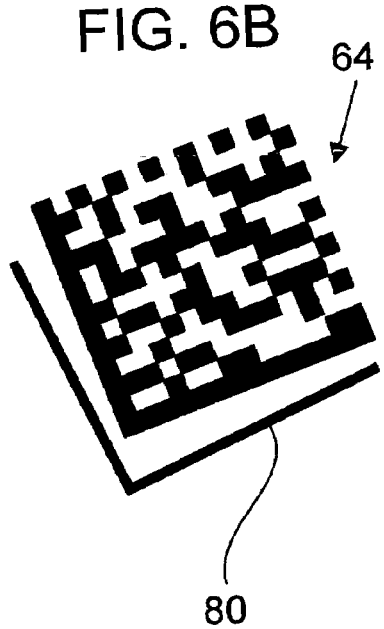
FIG. 6B shows the data carrying 2-dimensional graphical symbol of FIG. 6A more closely aligned with the presented graphical alignment indicator.
Figure 6C:
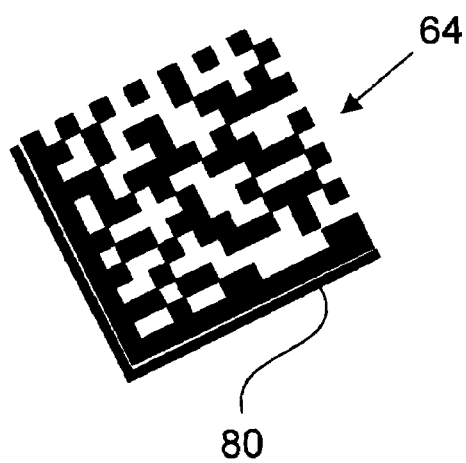
FIG. 6C provides the data carrying 2-dimensional graphical symbol of FIGS. 6A and 6B, which is now depicted substantially aligned with the presented graphical alignment indicator.
Figure 7A:
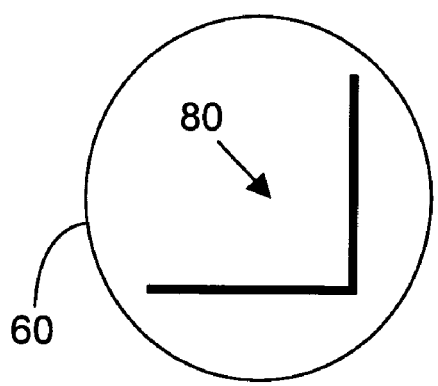
FIGS. 7A, 7B, 7C, and 7D illustrate a graphical alignment indicator in each of four pre-defined orientations and positions, which may also be termed four orientation-position pairs.
Figure 7B:
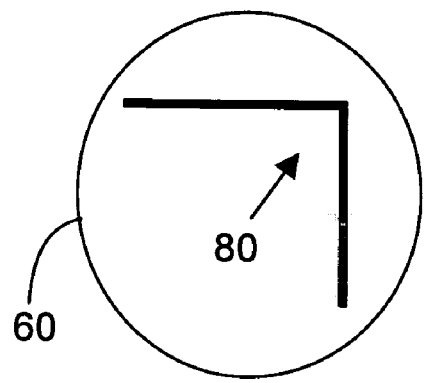
Figure 7C:
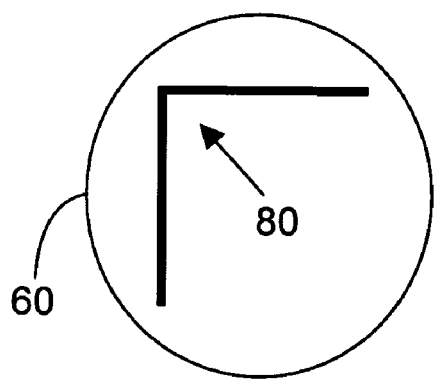
Figure 7D:
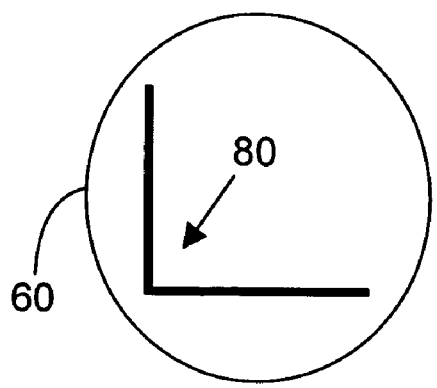

In FIG. 6B the data carrying 2-dimensional graphical symbol 64 is shown more closely aligned with the presented graphical alignment indicator 80—but not yet substantially aligned. Finally, as shown in FIG. 6C, a data carrying 2-dimensional graphical symbol 64 is depicted substantially aligned with the presented graphical alignment indicator 80.

It may be noted that 'substantially aligned' may be assumed to be an aligning that is less than 'perfectly aligned' (which is not illustrated). To further quantify the term 'substantially aligned', an angular difference approach may be employed. For example, a perfect alignment may be assumed to provide an angular difference of zero (0) degrees, say between aligned linear surfaces of the graphical symbol 64 and the graphical alignment indicator. As such, a substantial aligning may be defined as any alignment having an angular difference of something greater than 0 degrees. That is, for a given application, any alignment with an angular difference of 2 degrees or less may be considered substantially aligned.

Accordingly, a "substantial aligning" is generally realized when there is either a precise visual aligning (not illustrated) or a close/substantial aligning (FIG. 6C) of one or more surfaces, sides, or other graphical features of both the graphical symbol 64 and graphical alignment indicator. Also, it is certainly possible to provide for the controller or the computing unit 50 to cause a changing or altering of the graphical alignment indicator upon a substantial aligning of the graphical symbol 64 and the graphical alignment indicator. For example, the graphical alignment indicator may be varied by a change of color, blinking, etc. Alternately, an audio signal or tone may be provided. In such cases, it may certainly be possible to additionally automate other activities, such as commencing the processing of digital image information, as well as subsequently providing a next graphical alignment indicator to which the data carrying 2-dimensional graphical symbol 64 is to be aligned. Such an automated system could certainly significantly reduce the time required for a full and complete evaluation—while also improving the accuracy.

In the preferred apparatus 10, 10a, or 10b of the present invention, the stored digital image information would typically be employed to evaluate the print quality of the graphical symbol—in at least one of a plurality of respective orientations and positions. For example, as shown in FIGS. 7A, 7B, 7C, and 7D a graphical alignment indicator may be placed, sequentially, in each of a plurality of four pre-defined and available orientations and positions. Further, each of the depicted orientations and positions within the FOV of an imaging device may equivalently be termed an 'orientation-position pair'. The number of orientation-position pairs may be increased and decreased, as needed, for the specific task that is required.

Referring now to FIGS. 8 through 10B, several basic and somewhat simplified methods of the present invention will be discussed. It is important to note that a most fundamental method of the invention calls for an imaging of the FOV of an imaging device (preferably causing a data carrying 2-dimensional graphical symbol to be imaged), and substantially simultaneously displaying the image of the graphical symbol and an image of the stationary graphical alignment indicator upon an available display device.

One preferred method of the invention is illustrated in the flowchart of FIG. 8. As shown, at 120 there is an imaging of the data carrying 2-dimensional graphical symbol. At 130, stored digital image information may be modified to include the graphical alignment indicator. Alternately, at 130, an image of a graphical alignment indicator may be loaded into an available image plane, or an equivalent functional structure. Next, at 134 the image information, which now includes both the image of the data carrying 2-dimensional graphical symbol and the image of the graphical alignment indicator, is displayed. If at 138 it is determined that the graphical symbol and graphical alignment indicator are not substantially aligned, the orientation and position of the graphical symbol may be altered at 140, and the method returns to step 120. Essentially, the loop including steps 120, 130, 134, 138, and 140 may be repeated until the graphical symbol is determined to be substantially aligned. As indicated above, once a graphical symbol is "substantially aligned" with a graphical alignment indicator, the method of the invention may, for example, call for one or more of the following actions to occur:

a) having the computing unit 50 provide an audio or visual signal to an operator positioning the graphical symbol;

b) initiate processing to determine items such as the print quality of the graphical symbol (based on the current orientation and position);

c) change the graphical alignment indicator to a next pre-defined orientation-position pair (possibly after a short delay); and or d) display additional graphical and or textual information of use to the operator or another nearby individual.

Accordingly, if at 138 the graphical symbol and graphical alignment indicator are substantially aligned, the method may end at 146, or alternately include additional processing activities at 142.

Turning now to FIG. 9, there is provided another flowchart depicting a second preferred method in accordance with the invention. As with the method of FIG. 8, there is an imaging of the data carrying 2-dimensional graphical symbol at 120, which results in a collecting of image data. At 124, the collected image data is transferred to a first memory. Next at 128, the image data, which may be termed digital image information, is transferred to a second memory. The graphical alignment indicator may be added or introduced to the digital image information stored in the second memory at 130. At 134, the resulting digital image information, now including the graphical alignment indicator, is displayed. As with the method of FIG. 8, if the data carrying 2-dimensional graphical symbol and graphical alignment indicator are determined at 138 not to be substantially aligned, a change of position and or orientation may be effected at 140, with the method repeating the step at 120.

As appreciated by skilled individuals, when employing a charge coupled imaging device, commonly termed a CCD, the step at 120 may result in a collecting of analog photon related information, which is subsequently digitized by well known analog-to-digital converters.

Figure 10A:
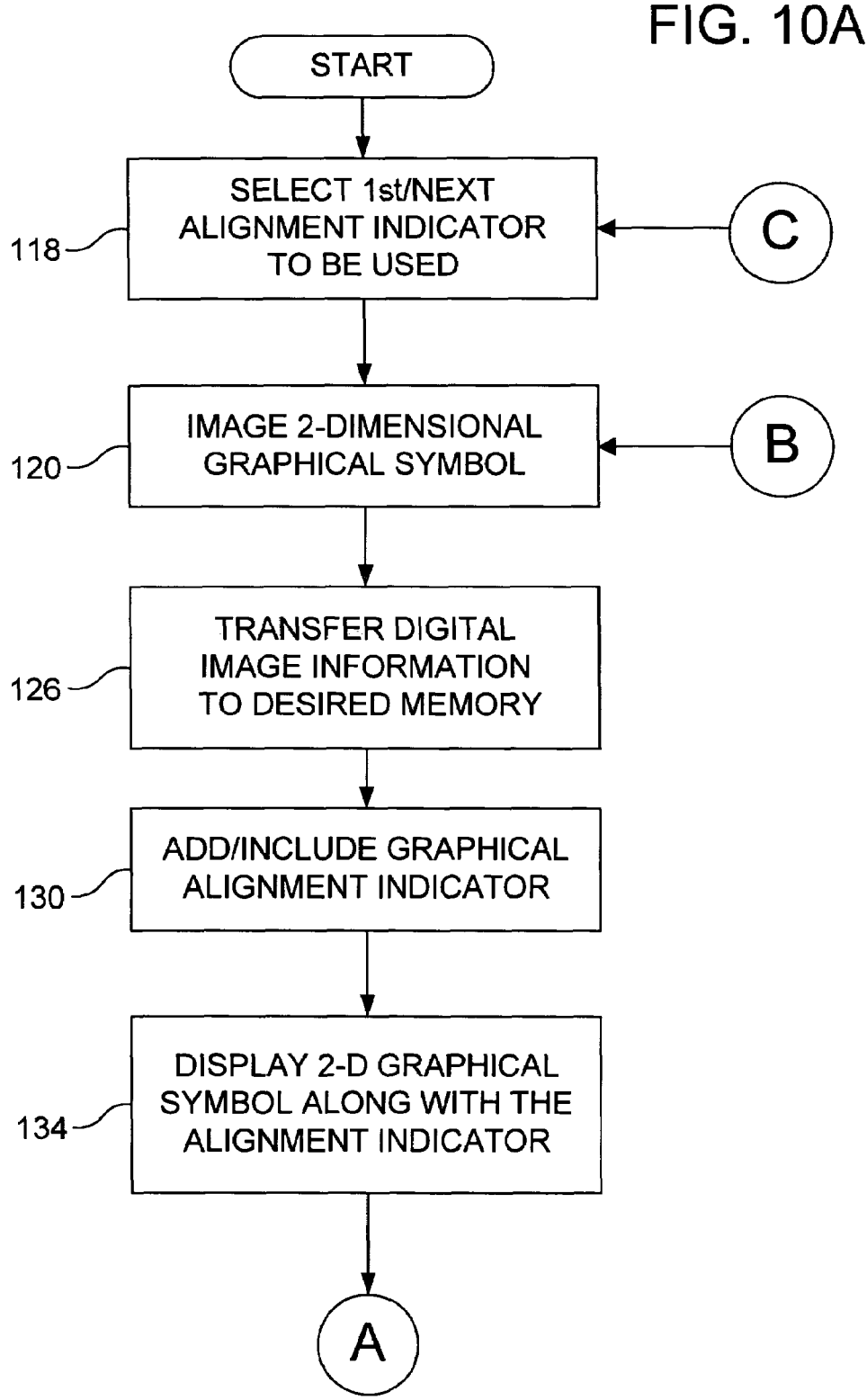
Figure 10B:
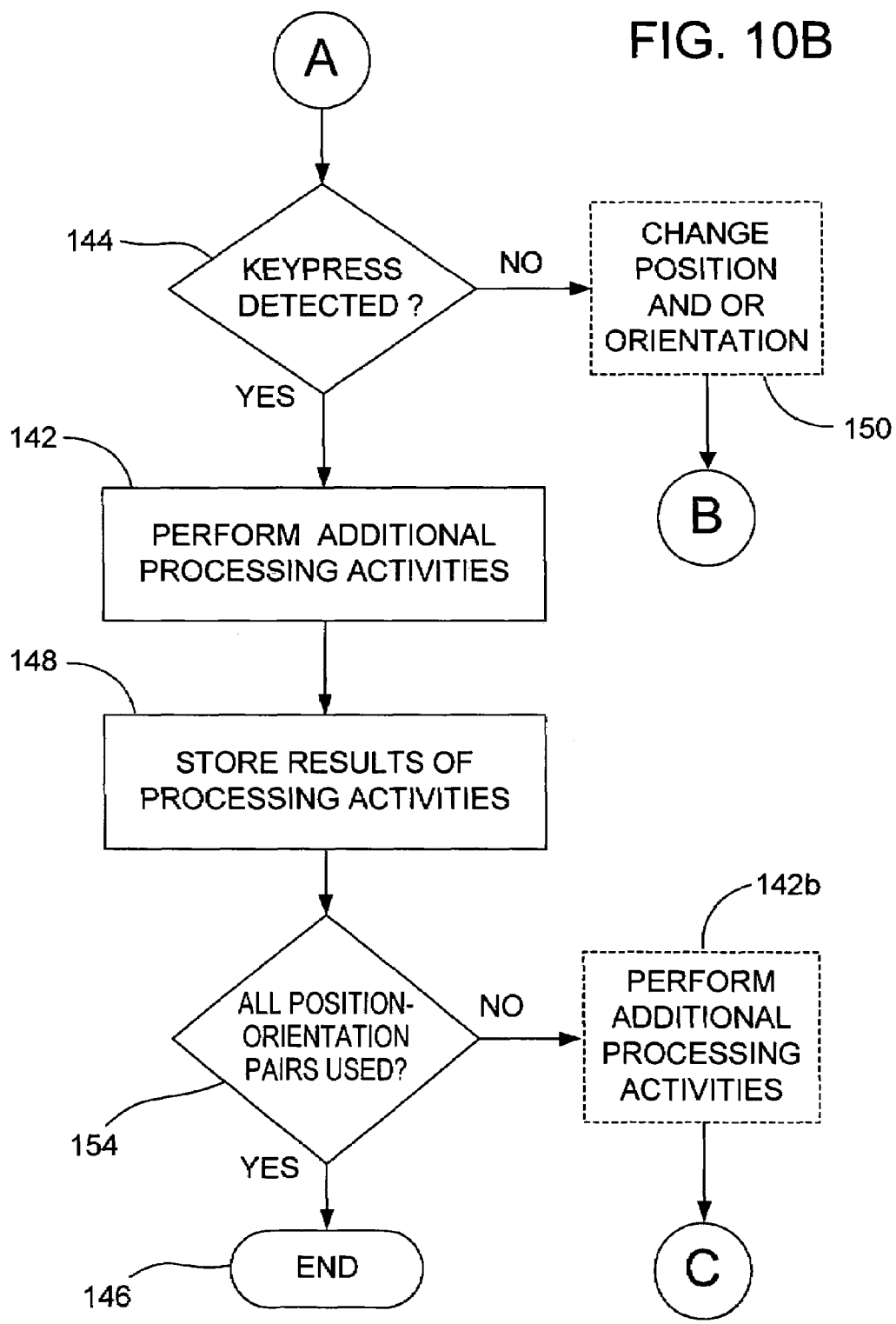

Referring now to FIGS. 10A and 10B, a possibly most preferred method of the invention may commence at the top of FIG. 10A with a selecting of a graphical alignment indicator at 118. For example, a specifically shaped graphical alignment indicator may be selected (for use with one or more data carrying 2-dimensional graphical symbols to be oriented, positioned, and imaged). Alternately, the step at 118 may enable a graphical alignment indicator's orientation and position to be selected or altered, to collect additional image data at another orientation and position. Next, at 120 an imaging of the data carrying 2-dimensional graphical symbol occurs. At 126, image information is transferred, as needed, to a selected memory. At step 130, as discussed hereinabove, there is a modifying or appending of image information, with the resulting digital image information displayed at 134.

As shown at the top of FIG. 10B, this present method may continue via connector-A, and provide for a keypress to be sensed at 144. For example, a pushbutton or keyboard key may be pressed if an operator determines that the data carrying 2-dimensional graphical symbol and the graphical alignment indicator are substantially aligned. Should no keypress (or functionally equivalent command/input) be detected at 144, the position of the data carrying 2-dimensional graphical symbol may be altered at 150, with the method looping and repeating, via connector-B, at step 120. If at 144 a keypress or other indication is detected, step 142 may be included to provide for additional processing, as required, with results being stored at 148. The processing at 142 and storing at 148 may, for example, provide for print quality data or information to be determined, stored, printed, and or transmitted to a remote site. At 154, a check may be made to determine if the data carrying 2-dimensional graphical symbol has been imaged at each desired orientation-position pair. If not, additional processing may be provided at 142b, if needed. Next, a looping occurs back to the step at 118 (via connector-C), for selecting a next graphical alignment indicator for subsequent imaging activities. Accordingly, the method of FIGS. 10A and 10B explicitly provides for the imaging and collecting of associated digital image information of the data carrying 2-dimensional graphical symbol in each of a plurality of orientations and positions, as required, for example, for a specific evaluation and verification application.

Returning to FIG. 10B, if at 154 it is determined that all available graphical alignment indicators have been used, the method may end at 146, possibly by providing an overall evaluation result.

While there have been described herein a plurality of the currently preferred embodiments of the methods and means of the present invention, those skilled in the art will recognize that other and further modifications may be made without departing from the invention. As such, the foregoing descriptions of the specific embodiments of the present invention have been presented for the purposes of illustration, description, and enablement. They are not intended to be exhaustive or to limit the invention to the specific forms disclosed and or illustrated. Obviously numerous modifications and alterations are possible in light of the above teachings, and it is fully intended to claim all modifications and variations that fall within the scope of the appended claims provided hereinafter.

What is claimed is:

1. An alignment method for orienting and positioning a data carrying 2-dimensional graphical symbol within a field of view of an imaging device, the method comprising the steps of:
   a) displaying, upon a display device, an image of the data carrying 2-dimensional graphical symbol, which is located within the field of view of the imaging device, with the displaying of the image of the data carrying 2-dimensional graphical symbol involving a collecting and storing of digital image information; and
   b) displaying, also upon the display device, a stationary graphical alignment indicator, which is displayed along with the image of the data carrying 2-dimensional graphical symbol, for aiding in substantially aligning the data carrying 2-dimensional graphical symbol with the graphical alignment indicator;
   c) wherein the collecting, storing, and displaying of digital image information is repeated, enabling a repeated updating of the displayed image of the data carrying 2-dimensional graphical symbol, thereby providing feedback for moving the graphical symbol within the field of view of the imaging device for effecting the substantial aligning of the image of the graphical symbol and the graphical alignment indicator;
   d) providing an additional step such that once the data carrying 2-dimensional graphical symbol is substantially aligned with the graphical alignment indicator, a processing of the digital image information results in a determining of a print quality of the data carrying 2-dimensional graphical symbol.

2. The alignment method as recited in claim 1, wherein the additional step providing for the processing of the digital image information, upon the substantial aligning of the graphical symbol and the graphical alignment indicator, is initiated by at least one of:
   a) a manual input from an operator observing the substantial aligning; and
   b) an automatically generated command produced as a result of processing and analyzing the digital image information and determining that the data carrying 2-dimensional graphical symbol is substantially aligned with the graphical alignment indicator.

3. The alignment method as recited in claim 1, wherein the determining of the print quality also results in at least one of:
   a) displaying upon the display device the determined print quality;
   b) recording the determined print quality for later recalling;
   c) transmitting the determined print quality to a remote location; and
   d) causing a printing of the determined print quality, producing a hard copy record thereof.

4. The alignment method as recited in claim 1, wherein the step of displaying the graphical alignment indicator is realized, at least in part, by one of:
   a) altering the contents of a memory containing the stored digital image information, causing an effective overlaying of an image of the graphical alignment indicator upon the image of the graphical symbol contained within the digital image information;
   b) loading an image of the graphical alignment indicator into one of a plurality of image planes, with the loaded image plane configured for displaying the graphical alignment indicator, while at least one other image plane containing the image of the data carrying 2-dimensional graphical symbol, is configured for displaying the data carrying 2-dimensional graphical symbol; and
   c) writing the graphical alignment indicator into a plurality of memory locations, and configuring the plurality of memory locations written with the graphical alignment indicator as read only, such that the now read only memory locations are not subsequently written with other image information, as image information containing the data carrying 2-dimensional graphical symbol is written into the memory, thereby enabling the graphical alignment indicator to be loaded only once, for a current orientation and position.

5. The alignment method as recited in claim 4, including an additional step of selecting one of a plurality of available pre-defined graphical alignment indicators, with each available graphical alignment indicator differing by at least one of:
   a) having an associated and unique orientation-position pair; and
   b) having a unique shape for use with at least one specific type of data carrying 2-dimensional graphical symbol.

6. A method for aiding in the orienting and positioning of a data carrying 2-dimensional graphical symbol, located within a field of view of an imaging device, in order to place the data carrying 2-dimensional graphical symbol in at least one of a plurality of pre-defined orientation-position pairs, the method comprising the steps of:
   a) displaying a graphical alignment indicator upon a display device, in a selected pre-defined orientation-position pair, selected from a plurality of the pre-defined orientation-position pairs, with the graphical alignment indicator displayed for indicating a currently desired orientation and position in which the data carrying 2-dimensional graphical symbol is to be placed within the field of view of the imaging device;
   b) displaying repeatedly an image of the data carrying 2-dimensional graphical symbol upon the display device, for viewing along with the graphical alignment indicator; and
   c) moving the data carrying 2-dimensional graphical symbol and substantially aligning the image of the data carrying 2-dimensional graphical symbol with the image of the graphical alignment indicator.

7. The method as recited in claim 6, wherein an additional step is provided such that once the data carrying 2-dimensional graphical symbol is substantially aligned with the graphical alignment indicator, digital image information is processed for determining a print quality of the data carrying 2-dimensional graphical symbol.

8. The method as recited in claim 7, wherein the additional step providing for the processing of the digital image information upon the substantial aligning of the image of the graphical symbol and the graphical alignment indicator is initiated by at least one of:
   a) a manual input from an operator observing and confirming substantial aligning; and
   b) an automatically generated command produced as a result of processing and analyzing the digital image information and determining that the data carrying 2-dimensional graphical symbol is substantially aligned with the graphical alignment indicator.

9. The method as recited in claim 8, wherein the step of including a determining of the print quality results in at least one of:
   a) displaying upon the display device the determined print quality;
   b) recording the determined print quality for later recalling;
   c) transmitting the determined print quality to a remote location; and
   d) causing a hardcopy printing of the determined print quality.

10. The method as recited in claim 6, wherein the step causing the displaying of the graphical alignment indicator, includes at least one of:
   a) modifying the digital image information to introduce an image of the graphical alignment indicator to the digital image information containing the image of the data carrying 2-dimensional graphical symbol;
   b) transferring the digital image information from a first memory to a second memory, and modifying the digital image information within the second memory to introduce the graphical alignment indicator; and
   c) transferring an image of the graphical alignment indicator into a pre-selected image plane, with the pre-selected image plane employed to hold and display the image of the graphical alignment indicator.

11. A method for orienting and positioning a data carrying 2-dimensional graphical symbol within a field of view of an imaging device, the method comprising the steps of:
   a) imaging the graphical symbol located within the field of view of the imaging device, with the imaging causing a storing of digital image information including the image of the graphical symbol;
   b) modifying the stored digital image information, causing a graphical alignment indicator to be included with the stored image information; and
   c) displaying the resulting stored and modified digital image information modified of step-b, now including the graphical alignment indicator, upon a display device for aiding in substantially aligning the data carrying 2-dimensional graphical symbol with the graphical alignment indicator.

12. The method as recited in claim 11, wherein the steps of imaging, modifying, and displaying the digital image information are repeated, causing a repeated displaying of the data carrying 2-dimensional graphical symbol, and thereby providing feedback for aligning the graphical symbol.

13. The method as recited in claim 12, wherein an additional step is included such that upon a substantial aligning of the graphical symbol and the graphical alignment indicator a processing is effected upon stored digital image information causing an evaluating of the print quality of the data carrying 2-dimensional graphical symbol, with the processing initiated by:
   a) a manual input from an operator observing the substantial aligning; and
   b) an automatically generated command produced as a result of processing and analyzing the digital image information and determining that the data carrying 2-dimensional graphical symbol has been substantially aligned with the graphical alignment indicator.

* * * * *